United States Patent
Noessing et al.

(10) Patent No.: US 9,025,733 B2
(45) Date of Patent: May 5, 2015

(54) METHOD AND APPARATUS FOR LINE TESTING

(75) Inventors: Gerhard Noessing, Villach (AT); Alberto Canella, Villach (AT)

(73) Assignee: Lantiq Deutschland GmbH, Neubiberg (DE)

(*) Notice: Subject to any disclaimer, the term of this patent is extended or adjusted under 35 U.S.C. 154(b) by 1746 days.

(21) Appl. No.: 11/489,376

(22) Filed: Jul. 18, 2006

(65) Prior Publication Data

US 2008/0019486 A1 Jan. 24, 2008

(51) Int. Cl.
*H04M 1/24* (2006.01)
*H04M 3/08* (2006.01)
*H04M 3/22* (2006.01)
*H04M 3/30* (2006.01)

(52) U.S. Cl.
CPC ........................................ *H04M 3/30* (2013.01)

(58) Field of Classification Search
USPC .................. 379/1.01, 1.03, 1.04, 10.02, 22, 379/22.01–22.03, 22.07, 22.08, 23, 24, 379/27.01, 27.03, 27.08, 29.01, 29.04, 379/30–31; 324/500, 512, 519, 522, 525, 324/527
See application file for complete search history.

(56) References Cited

U.S. PATENT DOCUMENTS

| | | | | |
|---|---|---|---|---|
| 3,904,839 A * | 9/1975 | Peoples | ...................... | 379/22.03 |
| 4,634,964 A * | 1/1987 | Chattler | ........................ | 324/628 |
| 5,202,882 A | 4/1993 | Rudolf | | |
| 5,625,667 A | 4/1997 | Vogt, III et al. | | |
| 5,867,557 A * | 2/1999 | D'Andrea et al. | ......... | 379/15.02 |
| 5,870,451 A | 2/1999 | Winkler et al. | | |
| 5,881,129 A * | 3/1999 | Chen et al. | .................. | 379/26.02 |
| 5,881,130 A * | 3/1999 | Zhang | ........................ | 379/27.08 |
| 6,453,016 B1 | 9/2002 | Chea, Jr. | | |
| 6,519,322 B1 | 2/2003 | Ludeman | | |
| 6,587,544 B2 | 7/2003 | Nossing et al. | | |
| 6,590,962 B1 | 7/2003 | Groessl et al. | | |
| 6,909,781 B1 | 6/2005 | Itri | | |
| 2002/0101980 A1 | 8/2002 | Ayoub et al. | | |
| 2002/0114444 A1 | 8/2002 | Anderson et al. | | |
| 2002/0118819 A1 | 8/2002 | Li | | |
| 2002/0141542 A1 | 10/2002 | Angliss et al. | | |
| 2004/0062361 A1* | 4/2004 | Kamali et al. | ............... | 379/1.04 |
| 2004/0109540 A1 | 6/2004 | Forsberg | | |
| 2005/0117732 A1 | 6/2005 | Arpin | | |
| 2005/0258841 A1 | 11/2005 | Blechschmidt et al. | | |
| 2006/0193444 A1 | 8/2006 | Aufenast et al. | | |
| 2007/0230667 A1 | 10/2007 | Warner et al. | | |

FOREIGN PATENT DOCUMENTS

| | | |
|---|---|---|
| EP | 0 808 053 | 11/1997 |
| EP | 0 580 947 | 5/1998 |
| EP | 1 219 097 | 4/2005 |

OTHER PUBLICATIONS

Office Action for U.S. Appl. No. 11/117,075 dated Jan. 12, 2009 (13 pages).

(Continued)

*Primary Examiner* — Quoc D Tran

(57) ABSTRACT

A method of testing a communication line includes applying a voltage as a function of time on the communication line. The function includes at least one ramp and at least one plateau. The method includes measuring a current flowing via the communication line, and calculating at least one electrical property of the communication line based on the voltage and the current.

41 Claims, 3 Drawing Sheets

(56) References Cited

OTHER PUBLICATIONS

Office Action for U.S. Appl. No. 11/117,075 dated Aug. 10, 2009 (7 pages).
Office Action for U.S. Appl. No. 11/489,131 dated Apr. 14, 2010 (11 pages).
Non-Final Office Action Dated Oct. 4, 2010 from U.S. Appl. No. 11/117,075. 12 Pages.
Final Office Action Dated Oct. 4, 2010 from U.S. Appl. No. 11/489,131. 16 Pages.
Office Action Dated Feb. 22, 2011 for U.S. Appl. No. 11/590,981. 13 Pages.

* cited by examiner

METHOD AND APPARATUS FOR LINE TESTING

CROSS-REFERENCE TO RELATED APPLICATIONS

This application is related to commonly assigned U.S. patent application Ser. No. 11/489,131, filed on even date herewith, entitled "METHOD AND APPARATUS FOR LINE TESTING," which is herein incorporated by reference.

BACKGROUND

In wired communication networks, terminal devices located in the premises of a customer (also referred to as subscriber) are connected with a central office via communication lines. An example for such a communication network is a public switched telephone network (PSTN). The corresponding telephone services is referred to as plain old telephone service (POTS). In such a case, terminal devices like telephones or facsimile devices, and also data transfer devices are connected with the central office via a pair of copper lines. The copper lines are commonly referred to as tip line and ring line. In the central office, the copper lines are typically connected with a subscriber line interface circuit (SLIC) on a corresponding line card, which in this case is generally referred to as a PSTN (or POTS) line card.

In the central office, a line testing procedure is typically regularly performed, to detect faults (e.g., broken lines) and also to identify if a telephone, a fax, or any other terminal device is connected to the line.

Such line testing is typically performed with dedicated line testing equipment which is coupled to the communication line to be tested, for example via switching elements (e.g., relays). Such dedicated line testing equipment is expensive and requires space. Furthermore, since often only one such dedicated line testing equipment is used for a large number of lines, line testing typically is only performed at larger intervals, for example every seven days.

For these and other reasons, there is a need for the present invention.

SUMMARY

One embodiment provides a method of testing a communication line including applying a voltage as a function of time on the communication line. The function includes at least one ramp and at least one plateau. The method includes measuring a current flowing via the communication line, and calculating at least one electrical property of the communication line based on the voltage and the current.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments relate to a method and an apparatus for line testing of communication lines.

Some embodiments provide line testing equipment and methods for line testing which do not require additional space, which are inexpensive, and which facilitate line testing being performed in shorter intervals in an effective manner.

One embodiment of a method for line testing includes applying a voltage as a function of time to a communication line. The function includes at least one ramp and at least one plateau. The method include measuring a current on the communication line, and calculating at least one electrical property based on the current and on the voltage.

A plateau herein refers to a period during which the voltage remains constant. A ramp herein refers to a period during which the voltage varies.

One embodiment of an apparatus for line testing includes a voltage generator configured to applying a voltage as a function of time to a communication line. The function including at least one plateau and one ramp. The apparatus includes a measure configured to measure a current on the line, and calculator configured to calculate at least one electrical property based on the voltage and on the current.

Figure 1:
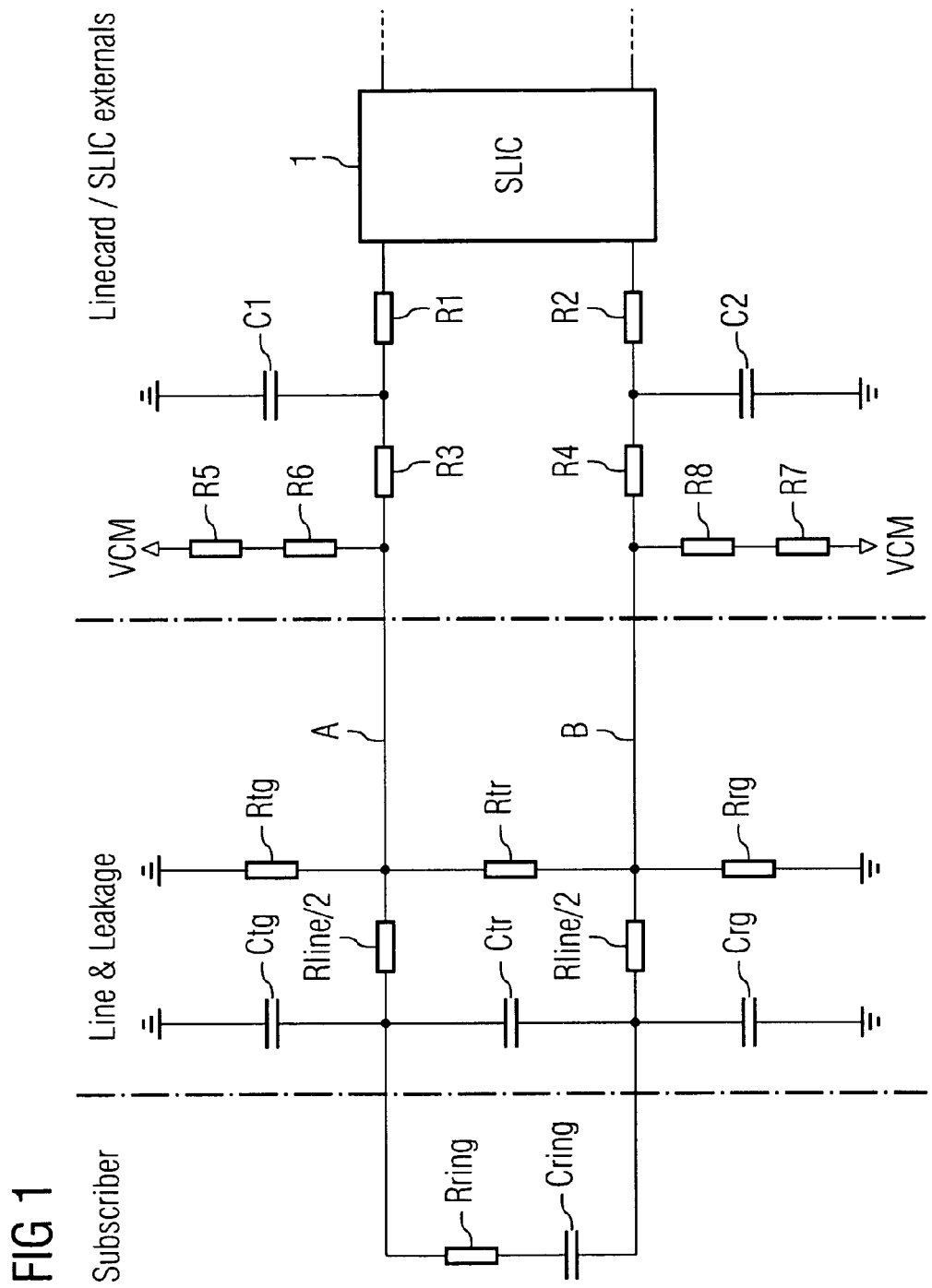
FIG. 1 illustrates an equivalent circuit of a PSTN communication line comprising a tip line and a ring line.

FIG. 1 illustrates one embodiment of an equivalent circuit for a tip line A and a ring line B of a copper line pair between a line card located in a central office and a subscriber (terminal device).

The line card comprise a subscriber line interface circuit (SLIC) 1. As explained further below in detail, line cards may comprise a plurality of subscriber line interfaces circuits and also other elements, such as coder/decoder (CODECs).

In the illustrated embodiment, tip line A is connected to SLIC 1 via resistances R3 and R1, whereas the ring line B is connected to SLIC 1 via resistances R4 and R2. Example suitable values are 30Ω for resistances R1 and R2 and 20Ω for resistances R3 and R4. Furthermore, capacitances C1 and C2 are connected between tip line and ring line, respectively, on the one hand and ground on the other hand. An example suitable value for capacitances C1 and C2 is 15 nF.

Resistances R1 through R4 stabilize and protect SLIC 1 and together with capacitances C1 and C2 form filters for filtering out unwanted frequency components.

Furthermore, tip line A is coupled with a common mode voltage VCM via resistances R5 and R6, and ring line B is connected with common mode voltage VCM via resistances R8 and R7. Example suitable values are 10 MΩ for resistances R6 and R8 and 47 k Ω for resistances R5 and R7. Therefore, as resistances R6 and R8 have large values, practically no current flows between tip line A and VCM and ring line B and VCM. However, as will be explained later in more detail, in one embodiment R5 and R6 as well as R8 and R7 serve as voltage dividers which enable a measurement of large voltages on tip line A and ring line B.

On a subscriber side (i.e., at a far end of the tip line A and the ring line B in customer's premises) a terminal device is present, represented by a resistance Rring and a capacitance Cring in FIG. 1. The values of Rring and Cring may change depending on a state of the terminal device, in particular an off-hook state where the device is active, for example when the subscriber receives a telephone call, and an on-hook state when the device is not active (i.e., no sending or receiving activity is present). Note that the representation of the subscriber in FIG. 1 is somewhat simplified, and additional elements, such as breakthrough diodes, additional resistors and capacitors parallel to the ones illustrated may be present in a full equivalent circuit diagram. However, the exact circuit diagram of the terminal device and the subscriber side is not needed for explaining embodiments of the present invention, and therefore to simplify and clarify FIG. 1 such further elements are omitted.

In a section designated "line and leakage" in FIG. 1 two resistances each designated Rline/2 are illustrated representing the resistance of tip line A and ring line B, such that the overall resistance of the communication line is Rline.

Leak resistances and capacitances are also illustrated in the "line and leakage" section of FIG. 1, namely Rtg as a leak resistance between tip line A and ground, Ctg as a leak capacitance between tip line A and ground, Rrg as a leak resistance between ring line B and ground, Crg as a leak capacitance between ring line B and ground, Rtr as a leak resistance between tip line A and ring line B, and Ctr as a leak capacitance between tip line A and ring B. In a fault-free state, the resistances Rtg, Rrg, and Rtr are very large (e.g., several tens of MΩ), and the capacitances Ctg, Crg, and Ctr are comparatively small (e.g., in the order of 47 nF per km of the line). Therefore, no significant direct current (DC) and only small alternating current (AC) currents may flow via these connections. In case one of these resistances or capacitances becomes small or large, respectively, this is an indication of a fault in the line. Embodiments discussed further below in detail provide efficient ways for measuring these leakage resistances and capacitances and therefore provide a possibility for testing whether the communication line is fault free in this respect.

Note that, as FIG. 1 is an equivalent circuit and not an actual circuit diagram, the leakage capacitances and/or resistances may comprise a plurality of components. For example, Rtg is not to be taken as a single resistor, but describes the overall resistance of possibly a plurality of leakage paths between tip line A and ground. The same holds true for the remaining elements.

Furthermore, note that tip line A and/or ring line B may be accidentally connected to a voltage, for example if tip line A is connected with a wire of a different communication line such that the voltage applied on that different communication line is also coupled with tip line A. However, the detection and handling of such foreign voltage is not subject of the present application, and therefore this case is not discussed or depicted here, but is discussed in detail in the above incorporated patent application Ser. No. 11/489,131. Nevertheless, it should be noted that the embodiments described may be easily combined with methods or devices for evaluating such connections to foreign voltages, simply by performing the necessary measurements one after the other.

One embodiment of a method will be described in reference to FIGS. 2 and 3. Basically, this embodiment determines the leakage capacitances and resistances by applying a voltage to tip line A, ring line B or both and measuring a corresponding current. In order to be able to apply a voltage only on tip line A or only on ring line B, the respective other line is set to a high impedance state, which essentially means that the respective line is disconnected. In case of FIG. 1, where both lines are connected to SLIC 1, this may be accomplished by setting a corresponding line driver which in normal operation is used to apply a voltage and/or a current to the respective line to a high impedance state, or by providing a switch with which the line may be disconnected.

Figure 2:
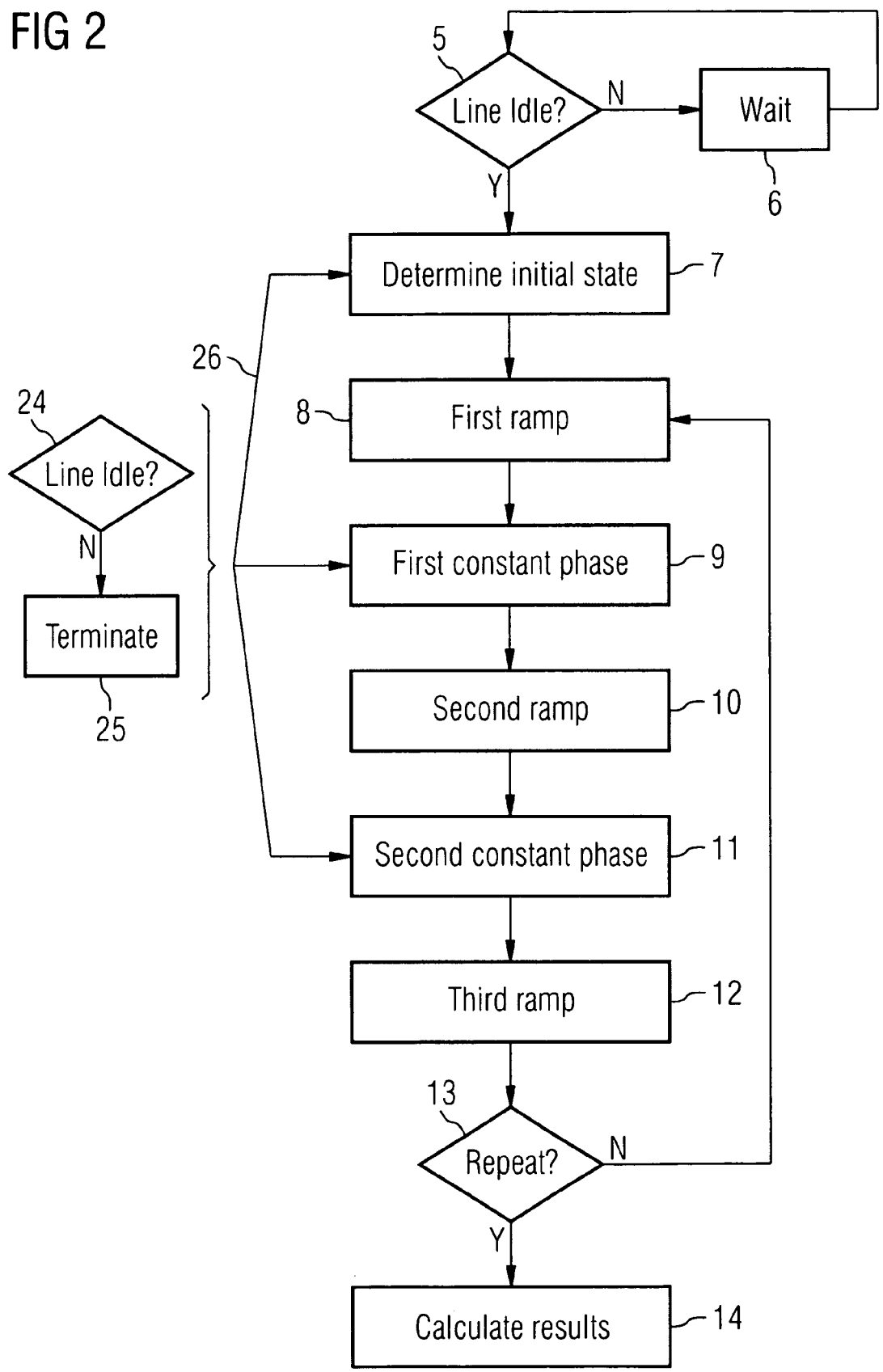
FIG. 2 illustrates a flow diagram of one embodiment of a method.

FIG. 2 illustrates a flow diagram of one embodiment of the method. FIG. 3 illustrates the voltage applied on tip line A and/or ring line B as a function of time when carrying the method illustrated by the flow diagram of FIG. 2.

At 7, the line to be tested is checked to determine if it is in an idle state. An idle state in this case designates a state in which a terminal device on the far end of the line is not active (i.e., an on-hook state). In the on-hook state, a terminal device, such as, a telephone, on the far end of the line has a large capacity Cring (see FIG. 1), and consequently no DC current flows even if a voltage is applied to the line card (e.g., a voltage of 48 V which is a standard voltage between tip line A and ring line B for PSTN systems) and which voltage usually provides a power supply for the terminal device. On the other hand, if the line is not idle (i.e., in an off-hook state) a significant DC current may be detected when a voltage is applied. If the line is not idle, at 6 a wait is performed for a certain time, for example half an hour, and then step 5 is repeated. This ensures that the line testing which follows is not performed while the terminal device is used since the test procedure could interrupt or disturb for example a conversation between the subscriber and another subscriber.

If the line is found to be idle at 5, at 7 the initial state is determined (i.e., it is checked which voltages Vtip0, Vring0 are present on tip line A and ring line B) respectively. This corresponds to section 15 in FIG. 3. In this respect, in FIG. 3 curve 22 illustrates the voltage applied to tip line A, and curve 23 illustrates the voltage Vring applied to ring line B. The determined values are stored to be used later.

After the initial state has been determined, a first run of measurement starts. This first run of measurements in the embodiments discussed in the following is performed with both the tip line and ring line connected (i.e., the voltages applied are differential voltages). At 8, corresponding to section 16 of FIG. 3, a first voltage ramp is applied to tip line A and ring line B starting with the initial state 15 (Vtip0, Vring0) and ending with predetermined voltages Vtip1, Vring1 as illustrated in section 17. The ramp speed at 8 may be chosen to be 200 V/s, although different values may also be used. While ramping the voltage from Vtip0 to Vtip1 and from Vring0 to Vring1 at 8 corresponding to section 16, the current flowing is measured. From this measurement, a first estimate Cr1 for the capacitance between tip line A and ring line B may be calculated, the capacitance mainly being determined by Cring because Cring typically is much larger than Ctr. This estimate may be calculated according to $$Cr1 = Ir1 \bigg/ \left(\frac{dV}{dt}\right) \qquad (1)$$

wherein Ir1 is the current measured during the first voltage ramp and wherein the resistance Rring is disregarded which is acceptable for an estimate. According to equation (1), the measurement becomes more precise when dV/dt (i.e., the slope of the ramp) is set to a larger value since in this case also the current Ir1 becomes larger and therefore the influence for example of noise on the measurement diminishes. On the other hand, in case the terminal device is an older telephone which has a mechanical ringer, with a ramp steeper than the above-mentioned 200 V/s, a mechanical noise can be caused in the mechanical ringer which may be disturbing to the subscriber and/or give him the impression that the telephone is about to ring. Therefore, the ramp should be set such that no such mechanical noise is induced.

The value Cr1 may be used to check whether such a mechanical ringer is present. In particular, if Cr1 is large (e.g., greater than 500 nF) a mechanical ringer is probably present, since typical values Cring for mechanical ringers are in the range of 1 µF and greater. On the other hand, if Cr1 is below 500 nF, it is safe to assume that no mechanical ringer is present, and the second and third ramp discussed below may be carried out with a greater slope leading to more precise results without the danger of inducing mechanical noise.

Figure 3:
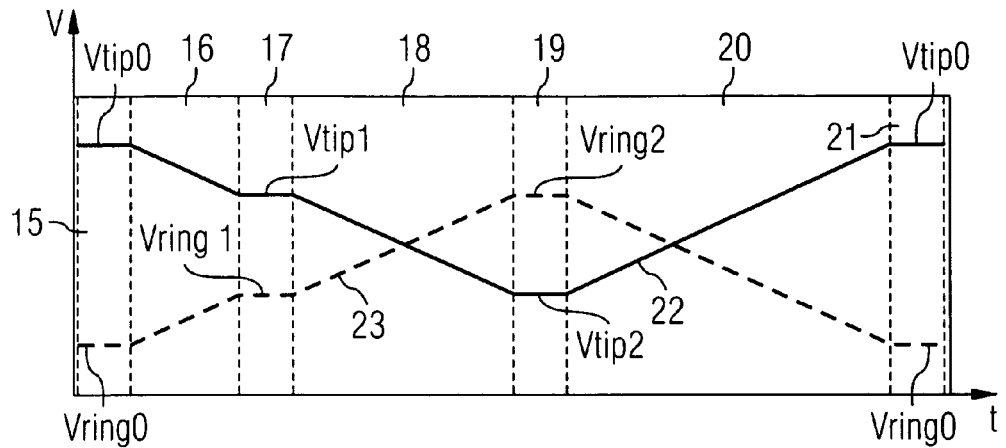
FIG. 3 illustrates example voltage curves of the method embodiment of FIG. 2.

Following the first ramp, at 9 a first constant phase corresponding to a plateau in section 17 in FIG. 3 is carried out. At 9, the current is measured while the constant voltages Vtip1 and Vring1 are applied. In this respect, after the end of the first ramp it takes some time until the current assumes a steady state value, this time being dependent on the capacitances and serial resistances of the line. To ensure that the current is measured when the steady state is at least approximately assumed, it is possible to measure the current for example every 30 ms and only to take the measured value as (approximately) the steady state value if the difference between two such measurements is less than a predetermined value, for example 10 µA. This steady state DC current is then, as will be explained below in more detail, indicative of the resistances of the line, as in steady state with a constant DC voltage applied the capacitances are basically non-conductive and therefore do not contribute to the measured current. As an example, when the terminal device is a phone according to the 5 US-REN standard where Rring is 1.4 kΩ and Cring is 40 µF, the current which flows for loading Cring 200 ms after the first ramp is terminated is so large that is corresponds to a 70 kΩ resistor which would influence the result for the resistances.

The steady state current measured at 9 in the following will be designated as Is1, and the corresponding voltage Vs1 corresponds to Vtip1-Vring1.

At 10, a second voltage ramp as illustrated in section 18 of FIG. 3 is applied to tip line A and ring line B. As explained above, the slope of the second ramp may be chosen depending on the result of the estimation of Cr1 at 8 according to equation (1) (i.e., if the result of equation (1) indicates that a mechanical ringer is present) a slope of 200 V/s may be chosen, whereas when no mechanical ringer is present a greater slope (e.g., 1000 V/s), may be used. The current flowing during the voltage ramp is measured and will be designated in the following by Ir2. This second voltage ramp ends when the voltage on tip line A reaches a predetermined voltage Vtip2, and the voltage on the ring line B reaches a predetermined voltage Vring2. In one embodiment, Vtip2 may be chosen to be equal Vring1, and Vring2 may be equal to Vtip1, although this is not necessary.

After 10, a second constant phase 19 follows at 11 in which, in a similar manner to at 8, the steady state current Is2 is measured which corresponds to the voltage Vs2=Vtip2−Vring2.

Following this, at 12 corresponding to section 20 of FIG. 3 a third voltage ramp is applied to tip line A and ring line B. The slope of the third ramp may be chosen to be the opposite of the slope of the second ramp (i.e., the opposite sign but the same magnitude), but it may also be chosen to have a different value. The end voltages reached as indicated by section 21 of FIG. 3 are the initial voltages Vtip0, Vring0 as determined in at 7, such that after the third ramp the line is again in its initial state. During the third ramp, again the current, designated Ir3, is measured.

As indicated at 13 in FIG. 3, steps 8 to 12 are basically repeated two more times, one time with tip line A set to a high impedance state and one time with ring line B set to a high impedance state. When the tip line is set to a high-impedance state, only a voltage to the ring line, for example following curve 23 of FIG. 3, is applied, and when ring line B is set to a high impedance state, only a voltage to tip line A, for example following curve 22 of FIG. 3, is applied. The voltages themselves may be the same as during the first run of steps 8-12, but they also may be chosen differently. During the second and third run of steps 8-12, basically the same measurements are carried out as in the first run, only that the currents are measured only on the line which is not set to an high-impedance state.

Moreover, the estimation of the capacitance at 8 during the first ramp may be omitted during the second and third run since it has already been determined which kind of ringer is present in the first run. When tip line A is set to a high impedance state during the third run the current measured at 8 is designated Ir4, the current measured at 9 is designated Is3, the current measured at 10 is designated Ir5, the current measured at 11 is designated Is4 and the current measured at 12 is designated Ir6. When the ring line is set to a high impedance state during the third run, the current measured at 8 is designated Ir7, the current measured at 9 is designated Is5, the current measured at 10 is designated Ir8, the currents measured at 11 is designated Is6 and the current measured at 12 is designated Ir9. The following table illustrates an overview of the currents measured during the three runs:

| Step | tip line and ring line connected (1st run) | tip line high impedance (2nd run) | ring line high impedance (3rd run) |
| --- | --- | --- | --- |
| 8 | Ir1 | Ir4 | Ir7 |
| 9 | Is1 | Is3 | Is5 |
| 10 | Ir2 | Ir5 | Ir8 |
| 11 | Is2 | Is4 | Is6 |
| 12 | Ir3 | Ir6 | Ir9 |

However, it should be noted that Ir4 and Ir7 are not necessarily needed later on, such that these measurements may also be omitted. The first ramp, however, is, in the embodiment discussed performed nevertheless since otherwise an abrupt change of the voltage corresponding to a voltage ramp with a huge slope would be applied to the lines, which in turn could lead to the already discussed mechanical noise in a mechanical ringer.

Finally, at 14 the results of the measurements for the leak resistances and capacitances illustrated in FIG. 1 are calculated as will be explained now in further detail.

According to the present embodiment, from the measurements performed during the first run of steps 8-12 (i.e., with neither tip line A nor ring line B set to a high impedance state) a total resistance Rtr_tot is calculated according to $$\text{Rtr\_tot} = \frac{Vs1 - Vs2}{Is1 - Is2} \quad (2)$$

and a total capacitance Ctr_tot is calculated according to $$\text{Ctr\_tot} = \frac{Ir2 - Ir3}{\left(\frac{dV}{dt}\right)_2 - \left(\frac{dV}{dt}\right)_3} \quad (3)$$

wherein $\left(\frac{dV}{dt}\right)_2$ designates the slope of the second ramp and $$\left(\frac{dV}{dt}\right)_3$$

designates the slope of the third ramp.

Likewise, during the second run of steps 8-12 when tip line A is set to a high impedance state and therefore the measurements are basically performed between ring line and ground, a total resistance Rgr_tot according to $$\text{Rrg\_tot} = \frac{Vring1 - Vring2}{Is3 - Is4} \quad (4)$$

and a total capacitance Crg_tot according to $$\text{Crg\_tot} = \frac{Ir5 - Ir6}{\left(\frac{dV}{dt}\right)_2 - \left(\frac{dV}{dt}\right)_3} \quad (5)$$

are calculated.

Finally, for the third run of steps 8-12 with ring line B set to a high impedance state, a total resistance Rtg_tot according to $$\text{Rtg\_tot} = \frac{Vtip1 - Vtip2}{Is5 - Is6} \quad (6)$$

and a total capacitance Ctg_tot according to $$\text{Ctg\_tot} = \frac{Ir8 - Ir9}{\left(\frac{dV}{dr}\right)_2 - \left(\frac{dV}{dt}\right)_3} \quad (7)$$

are calculated.

Note that the above equations assume that the values for Vtip1, Vtip2, Vring1, Vring2 as well as for the slopes $$\left(\frac{dV}{dt}\right)_2, \left(\frac{dV}{dt}\right)_3$$

remain the same for all three runs. It is also possible to vary these parameters from run to run, in which case the appropriate values have to be used for equations (2) to (7). Furthermore, for obtaining correct results, in the above equation the signs of the voltages and currents have to be taken into account.

In the present embodiment, as evident from the above equations (2) to (7) the resistances and capacitances are calculated in a differential manner (i.e., by making two separate measurements and taking the difference between these measurements for calculation). This has the advantage that any offsets are cancelled out and therefore the measurements become more precise.

Furthermore, as already explained above, for the current measurements in sections 17 and 19 of FIG. 3 which are used for the calculation of the resistances the measurement is performed only when approximately a steady state has been reached. Since in the embodiment illustrated, the ramps in sections 16 and 18 corresponding to steps 8 and 10 run in the same direction (i.e., the sign of the slopes is equal) any current due to charging of capacitances still remaining during sections 17 and 19 has the same sign and is therefore at least approximately cancelled out when the corresponding currents are subtracted in equations (2), (4) and (6). This enhances the exactness of the measurement in the embodiment illustrated.

The resistances and capacitances obtained from equations (2) to (7) are related as follows with the capacitances and resistances illustrated in FIG. 1:

$$\frac{1}{\text{Rtr\_tot}} = \frac{1}{Rtr} + \frac{1}{4 \cdot Rtg} + \frac{1}{4 \cdot Rrg} + \frac{1}{4 \cdot (R5+R6)} + \frac{1}{4 \cdot (R7+R8)} \quad (8)$$

$$\frac{1}{\text{Rtg\_tot}} = \frac{1}{Rtg} + \frac{1}{R5+R6} + \frac{1}{Rtr + \left(\frac{1}{Rrg} + \frac{1}{R7+R8}\right)^{-1}} \quad (9)$$

$$\frac{1}{\text{Rrg\_tot}} = \frac{1}{Rrg} + \frac{1}{R7+R8} + \frac{1}{Rtr + \left(\frac{1}{Rtg} + \frac{1}{R5+R6}\right)^{-1}} \quad (10)$$

$$\text{Ctr\_tot} = Ctr + Cring + \frac{Ctg}{4} + \frac{Crg}{4} + \frac{C1}{4} + \frac{C2}{4} \quad (11)$$

$$\text{Ctg\_tot} = Ctg + C1 + \frac{(Ctr + Cring)(Crg + C2)}{Ctr + Cring + Crg + C2} \quad (12)$$

$$\text{Crg\_tot} = Crg + C2 + \frac{(Ctr + Cring)(Ctg + C1)}{Ctr + Cring + Crg + C2} \quad (13)$$

Equations (8) to (10) are three linearly independent equations for three unknown variables Rtr, Rtg and Rrg. Therefore, these three variables can be calculated from equations (8) to (10) using any suitable method for solving sets of equations. Likewise, equations (11) to (13) are three linearly independent equations with three unknown variables (Ctr+Cring), Ctg and Crg. Therefore, these variables can also be calculated. Since Ctr and Cring are connected in parallel, these two capacitances in the present embodiment are determined together and not separately.

Consequently, with the measurements performed in the embodiments illustrated in FIG. 2 comprehensive information regarding the alliance may be obtained.

The embodiment illustrated in FIG. 2 also comprises steps 24 and 25. At 24, as indicated by arrows 26, continuously monitors during steps 7, 9 and 11 (i.e., during the states where the applied voltage is constant, whether the line is still idle). This may be accomplished by monitoring the current, wherein, as already explained, when the terminal device goes to an off-hook state, the line impedance suddenly changes and therefore also the current suddenly changes. Since, as explained above, the current may be determined every 30 ms anyway to determine whether a steady state has been reached, the monitoring at 15 may use these measurements. However, in principle it may also be performed at 8, 10 and 12 by checking whether abrupt changes in the current flowing occur.

If it is determined that the line is not idle any more at 15, at 16 the measurements are terminated to be repeated at a later point in time so as to not disturb any communication initiated or received by the subscriber.

The embodiment illustrated with reference to FIGS. 2 and 3, employs a continuous function of the voltage over time starting and ending in the initial state. Therefore, noise in a mechanical ringer may be prevented. Moreover, since the ramps between the plateaus of sections 17 and 19 of FIG. 3 are used for the capacitance measurements, wherein the plateaus themselves are used for resistance measurements, the measurement is carried out in a compact manner basically without unused time periods.

Note that the results of equations (3), (5) and (7) and consequently also of equations (11) to (13) may be somewhat imprecise due to resistances parallel to the respective capacitances. In order to avoid this problem, the actual measurement during the second ramp and third ramp may be performed at a zero crossing of the voltage, for the first run of measurements for example at the points where the voltage applied to tip line A is equal to the voltage applied to ring line B (i.e., at the crossing points of curves 22 and 23 in FIG. 3). Since for a zero voltage the current flowing via such parallel resistances is zero, the measured current is only due to current flowing via the capacitances.

Alternatively, since the steady state current is measured at 9 and 11 and may also be measured in section 21 of FIG. 3, the currents via the resistances at the beginning and end of the second and third ramps are known or may be easily measured. The current flowing via the resistances at a certain point of the second ramp or the third ramp may be then at least in good approximation be obtained by a simple linear interpolation and subtracted from the measured current before performing the calculation of equations (3), (5) and (7). In this case, in a corresponding embodiment the currents used for the calculation of Ctg_tot, Crg_tot and Ctr_tot are measured at the end of the second and third ramps since at the end of the ramps any onset effects which may be present at the start of the ramp have decayed.

For measuring currents, the current is usually integrated over a certain time in order to make the measurements more precise. In one embodiment, the integration time corresponds to the period of a power supply or a multiple thereof, for example 20 ms for a AC power supply or electricity network having a frequency of 50 Hz.

Apart from the calculations already described, further calculations may be performed in certain embodiments at 14 of FIG. 2, or the resistances and capacitances may be compared to nominal values to check whether a fault is present.

As already indicated, the currents flowing at 9 and 11 are measured at certain intervals, for example every 30 ms. This may be used to determine, (e.g., by storing these values and fitting an exponential decay function) a time constant of the decay. This time constant is determined by the load of the terminal device and basically corresponds to Rring·Cring. Therefore, also the resistance Rring may be at least estimated since in a normal state of the network Cring is much larger than Ctr and therefore (Cring+Ctr) as determined by equations (11) to (13) approximately equals Cring. Furthermore, the same time constant is determining when the current during the second ramp and third ramps reaches a steady state and therefore the time constant thus determined may be used to correct the currents measured during these ramps.

Additionally, based on the currents and voltages of steps 9 and 11 corresponding to sections 17 and 19, two separate resistances may be calculated and compared. This comparison may be performed by calculating a "balance" which is 50% if the two resistances are equal. For example, for the first run such a balance may be calculated according to $$B = \frac{\frac{Vs1}{Is1}}{\frac{Vs1}{Is1} + \frac{Vs2}{Is2}} \times 100\% \tag{14}$$

If this balance differs from 50%, this is an indication that a non-linear load is present (for example a resistance in series with a diode) or that Rtg and Rrg are not equal. Similar calculations may be performed during the second run or the third run.

While methods according to embodiments, as for example described above, may be carried out with dedicated test equipment comprising voltage sources and current meters for applying voltages to tip line A and ring line B and measuring corresponding currents, in other embodiments line cards which in normal operation are used for handling the communication via tip line A and ring line B are used for carrying out the measurement. This will be explained in more detail with reference to FIG. 4, illustrating a line card according to one embodiment.

In addition to the already described SLIC 1 which is connected with tip line A and ring line B a CODEC 2 is present. In particular, the embodiment of FIG. 4 makes use of the fact that SLICs, such as SLIC 1 in FIG. 4, nowadays typically have the capability of generating voltages and currents and measuring currents, whereas many CODECs have the capability of measuring voltages, for example via dedicated pins which in case of FIG. 4 are designated IO1 and IO2.

CODEC 2 additionally comprises a digital signal processor 3 together with digital-to-analog and analog-to-digital conversion capabilities. Such a CODEC with a digital signal processor may be used to convert the measurement data provided by SLIC 1 to digital data for further processing and also to generate analog AC or DC voltage or current signals which are then output to tip line A and/or ring line B via corresponding line drivers in SLIC 1. CODECs with corresponding capabilities are for example CODECs of the VINETIC™ product series by Infineon Technologies.

Figure 4:
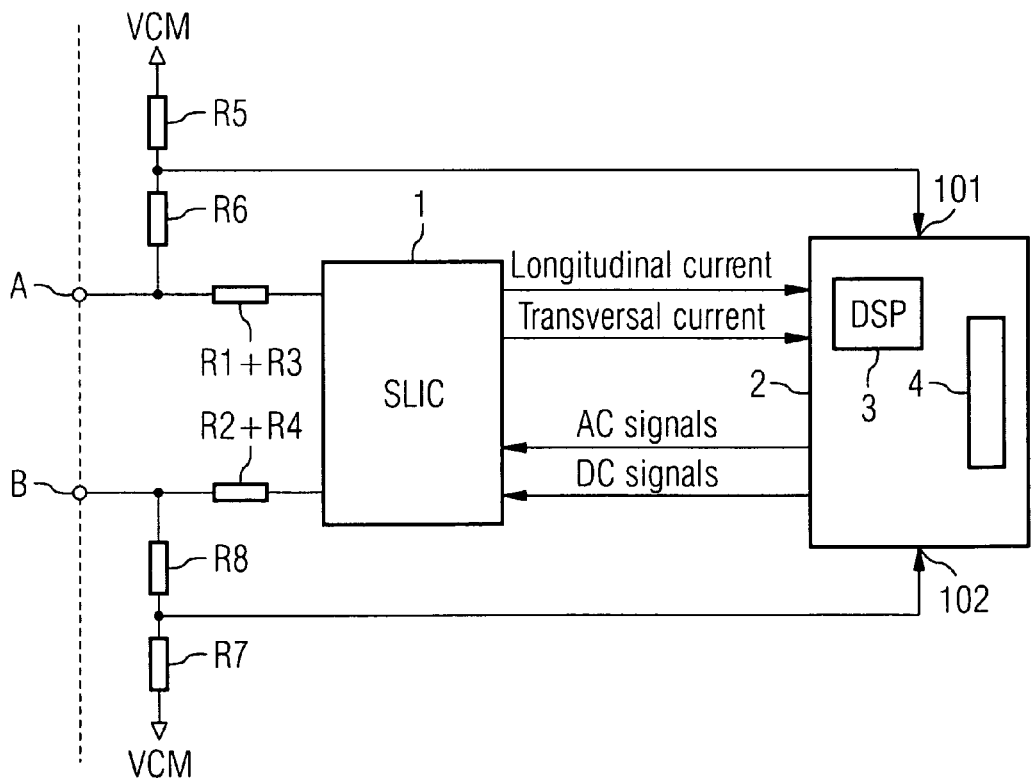
FIG. 4 illustrates a block diagram of one embodiment of an apparatus.

In particular, as indicated in FIG. 4, SLIC 1 has the capability of measuring both transversal currents (i.e., currents flowing via tip line A and ring line B) and longitudinal currents, which are measured on tip line A or only on ring line B.

As also illustrated in FIG. 4, in one embodiment, resistors R5 and R6 on the one hand and R7 and R8 on the other hand serve as voltage dividers and are correspondingly connected with pins IO1 and IO2 of CODEC 2. These voltage dividers enable also large voltages on tip line A or ring line B to be measured without overloading CODEC 2.

As already explained before, line cards may comprise more than one such SLIC/CODEC combination, in particular a plurality of these combinations so a plurality of pairs of tip line and ring line may be connected to such a line card.

In order to set tip line A or ring line B to a high impedance state as in the measurements of the embodiment described above with reference to FIGS. 2 and 3, a corresponding line driver in SLIC 1 may be set to a high impedance state (i.e., may be deactivated).

A plurality of line cards like the one illustrated in FIG. 4 are usually installed in a host which has data processing capabilities for controlling the line cards. For communication with the host, an interface 4 is provided in CODEC 2. For carrying out the method embodiments, for example the embodiments discussed with reference to FIGS. 2 and 3, according to one embodiment corresponding software is downloaded to a firmware memory of the host such that when the software is run on the host, the host controls the line card illustrated in FIG. 4 such that the method embodiments are executed (i.e., to perform the measurements). The calculations at 14 of FIG. 2 may be executed by a central processing unit in this host. The host together with the line card in one embodiment forms part of the central office equipment.

One embodiment as described above is easy to realize since line cards already present are used for carrying out the measurements so that no additional hardware is needed. It is sufficient to download corresponding measurement software into a firmware memory of the host in order to be able to control the line cards accordingly. Therefore, such embodiments are easily realized.

Note that numerous modifications to the embodiments discussed are possible without departing from the scope of the present invention, some of which modifications will be discussed below.

Regarding the embodiment of FIG. 2, the order of three runs of measurements may be changed. For example, the first run may be performed with the tip line set to a high impedance state, the second run may be performed with both lines active and the third run may be performed with the ring line set to a high impedance state. Any other order is also possible.

Furthermore, it is possible to omit steps 5 and/or 24, 25 in case the measurements should be carried out in any case even if the terminal device is in an off-hook state. This in particular may be the case if there is reason to believe that a severe fault is present which may damage equipment in which case any tests should be performed as quickly as possible.

In case only the resistances or only the capacitances of the equivalent circuit illustrated in FIG. 1 are of interest for some reason, only the corresponding measurements have to be performed (i.e., only the measurements during the plateaus (sections 17 and 19) or only the measurements during the ramps (in particular sections 18 and 20)). Furthermore, in case only the capacitances are of interest, the sections 17 and 19 may be omitted altogether. Of course, in some embodiments only some of the resistances or capacitances may be calculated, for example those between tip line A and ring line B.

The voltages and slopes of the ramps discussed above may in principle set freely as long as the voltages chosen do not damage the equipment. In particular, it is not necessary that as illustrated in FIG. 3 the voltages during the measurement are smaller than the voltages of the initial state. Furthermore, the calculation of the results at 14 of FIG. 2 may be split to several calculation steps, wherein after each run the corresponding values are calculated.

Also, note that the present invention is not limited to the use in PSTN equipment, but other communication lines may be measured with the same method and similar devices (i.e., using intrinsic properties of corresponding line cards). In case the communication runs over a single line (in contrast to the two lines, namely tip line A and ring line B, in PSTN networks) it is of course not necessary to set a line into a high impedance state, and in this case only one run of steps 8-12 of FIG. 2 would be necessary.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of testing a communication line, the method comprising:
    applying a voltage as a function of time on the communication line, the function comprising at least one ramp and at least one plateau;
    measuring a current flowing via the communication line while the voltage is applied; and
    calculating at least one electrical property of the communication line based on the voltage and the current,
    wherein the at least one ramp comprises a first ramp and a second ramp having different slopes.

2. The method according to claim 1, comprising: determining an initial voltage on the communication line; and determining the function, wherein the function is a continuous function starting and ending with the initial voltage.

3. The method according to claim 1, wherein the electrical property comprises at least one of a resistance and a capacitance.

4. The method according to claim 1, wherein the communication line comprises a pair of wires, the method comprising: setting one wire of the pair of wires to a high impedance state; and applying the voltage and measuring the current on the other wire of the pair of wires.

5. The method according to claim 1, wherein the applying and the measuring comprise controlling a line card to which the communication line is connected to perform the applying and the measuring.

6. The method according to claim 1, wherein the measuring comprises measuring the current during the plateau at a time when the current essentially has reached a steady state.

7. The method according to claim 1, comprising: determining a time constant of a load connected to the communication line based on a current measured during the plateau.

8. The method according to claim 1, wherein the measuring comprises measuring the current at a zero crossing of the voltage during the ramp.

9. The method according to claim 1, wherein the measuring comprises measuring the current at an end of the ramp.

10. A method of testing a communication line, the method comprising: determining a starting voltage present on the communication line; applying a first voltage ramp on the communication line from the starting voltage to a first predetermined voltage; measuring a first current while applying the first voltage ramp; constantly applying the first predetermined voltage; measuring a second current during the constant application of the first predetermined voltage; applying a second voltage ramp on the communication line from the first predetermined voltage to a second predetermined voltage; measuring a third current during the second ramp; constantly applying the second predetermined voltage; measuring a fourth current during the constantly applying of the second predetermined voltage; applying a third voltage ramp on the communication lines from the second predetermined voltage to the starting voltage; measuring a fifth current during the third ramp; and calculating at least one of a resistance and a capacitance associated with the communication line based on the applied voltages and the measured currents.

11. The method according to claim 10, comprising: calculating a capacitance connected to the communication line based on the first voltage ramp and the first current; and determining the slope of the second voltage ramp and the third voltage ramp based on the calculated capacitance.

12. The method according to claim 10, comprising: checking if the communication line is idle; and terminating the method if the communication line is not idle.

13. The method according to claim 12, wherein the checking is performed before the determining.

14. The method according to claim 12, wherein the checking is performed during the constantly applying.

15. The method according to claim 10, comprising: wherein the communication line comprises a pair of wires; wherein the applying and measuring are performed in a first run with both wires in a normal state, wherein in the applying the voltage is applied as a differential voltage to both wires and during the measuring the current flowing through both wires is measured; wherein the applying and measuring are performed in a second run with a first one of the wires set to a high impedance state, wherein in the applying the voltage is applied to a second one of the wires and the current is measured at a second one of this wires; and wherein the applying and measuring are performed in a third run with the second one of the wires set to a high impedance state, wherein in the applying the voltage is applied to the first wire and in the measuring the voltage is measured at the first wire.

16. The method according to claim 15, wherein at least one of the predetermined voltage and the second predetermined voltage differ between the first run, the second run, and the third run.

17. The method according to claim 10, wherein the calculating comprises calculating a resistance based on the first predetermined voltage, the second predetermined voltage, the second current, and the fourth current.

18. The method according to claim 10, wherein the calculating comprises calculating a capacitance based on a slope of the second voltage ramp, a slope of the third voltage ramp, the third current, and the fifth current.

19. The method according to claim 10, wherein the applying and the measuring comprise controlling a line card to which the communication line is connected to perform the applying and the measuring.

20. An apparatus for testing a communication line, comprising: means for applying a voltage as a function of time on the communication line, the function comprising at least one voltage ramp and at least one voltage plateau; means for measuring a current during the application of the voltage; and means for calculating at least one electrical property of the communication line based on the voltage and the current,
wherein the at least one plateau comprises a first plateau and a second plateau having different voltage levels.

21. The apparatus according to claim 20, comprising: means for determining an initial voltage on the line; and means for determining the function, wherein the function is a continuous function starting and ending with the initial voltage.

22. The apparatus according to claim 20, wherein the electrical property comprises at least one of a resistance and a capacitance.

23. The apparatus according to claim 20, wherein the communication line comprises a pair of wires, wherein the means for measuring comprises: means for setting one wire of the pair of wires to a high impedance state; and means for applying the voltage and measuring the current on the other wire of the pair of wires.

24. The apparatus according to claim 20, wherein the means for measuring and the means for applying comprise a subscriber line interface and a coder/decoder (CODEC).

25. The apparatus according to claim 20, wherein the means for measuring comprises means for measuring the current during the plateau at a time when the current essentially has reached a steady state.

26. The apparatus according to claim 20, comprising: means for determining a time constant of a load connected to the communication line based on a current measured during the plateau.

27. The apparatus according to claim 20, wherein the means for measuring comprises means for measuring the current at a zero crossing of the voltage during the ramp.

28. The apparatus according to claim 20, wherein the means for measuring comprises means for measuring the current at an end of the ramp.

29. An apparatus configured to test a communication line, the apparatus comprising: an adjustable voltage source configured to be coupled to the communication line; a current meter; and a control unit operatively coupled to the adjustable voltage source and the current meter, the control unit having a test mode, wherein, when the test mode is activated, the control unit is configured to control the adjustable voltage source and the current meter to apply a voltage as a function of time on the communication line, wherein the function comprises at least one ramp and one plateau, and to measure a current on the communication line during application of the voltage.

30. The apparatus according to claim 29, wherein when the test mode is activated, the control unit is configured to determine an initial voltage on the line, and determine the function, wherein the function is a continuous function starting and ending with the initial voltage.

31. The apparatus according to claim 29, wherein the adjustable voltage source and the current meter comprise a subscriber line interface circuit and a coder/decoder (CODEC).

32. A central office equipment comprising: at least one line card, the line card comprising a subscriber line interface circuit configured to be coupled to a communication line and a coder/decoder (CODEC); and a programmable control unit coupled to the line card and comprising storage configured to store a program comprising a test procedure, wherein, when the test procedure is run, the programmable control unit is configured to control the subscriber line interface and the CODEC to perform the following: determine a starting voltage present on the communication line; apply a first voltage ramp on the communication line from the starting voltage to a first predetermined voltage; measure a first current while applying the first voltage ramp; constantly apply the first predetermined voltage; measure a second current during the constant application of the first predetermined voltage; apply a second voltage ramp on the communication line from the first predetermined voltage to a second predetermined voltage; measure a third current during the second ramp; constantly apply the second predetermined voltage; measure a fourth current during the constantly applying of the second predetermined voltage; apply a third voltage ramp on the communication lines from the second predetermined voltage to the starting voltage; and measure a fifth current during the third ramp.

33. The central office equipment according to claim 32 wherein, when the test procedure is run, the programmable control unit is configured to calculate at least one of a resistance and a capacitance associated with the communication line based on the applied voltages and on the measured currents.

34. The central office equipment according to claim 32, wherein, when the test procedure is run, the programmable control unit is configured to perform the following: calculate a capacitance connected to the communication line based on the first voltage ramp and the first current; and determine the slope of the second voltage ramp and the third voltage ramp based on the calculated capacitance.

35. The central office equipment according to claim 32, wherein, when the test procedure is run, the programmable control unit is configured to perform the following: check if the communication line is idle; and terminate the test procedure if the communication line is not idle.

36. The central office equipment according to claim 32, comprising: wherein the communication line comprises a pair of wires; wherein the applying and measuring are performed in a first run with both wires in a normal state, wherein in the applying the voltage is applied as a differential voltage to both wires and during the measuring the current flowing through both wires is measured; wherein the applying and measuring are performed in a second run with a first one of the wires set to a high impedance state, wherein in the applying the voltage is applied to a second one of the wires and the current is measured at a second one of the wires; and wherein the applying and measuring are performed in a third run with the second one of the wires set to a high impedance state, wherein in the applying the voltage is applied to the first wire and in the measuring the voltage is measured at the first wire.

37. The central office equipment according to claim 32, wherein at least one of the predetermined voltage and the second predetermined voltage differ between the first run, the second run and the third run.

38. The central office equipment according to claim 32, wherein the calculating comprises calculating a resistance based on the first predetermined voltage, the second predetermined voltage, the second current, and the fourth current.

39. The central office equipment according to claim 32, wherein the calculating comprises calculating a capacitance based on a slope of the second voltage ramp, a slope of the third voltage ramp, the third current, and the fifth current.

40. A method of testing a communication line, the method comprising:
applying a voltage as a function of time on the communication line, the function comprising at least one ramp and at least one plateau;
measuring a current flowing via the communication line while the voltage is applied; and
calculating at least one electrical property of the communication line based on the voltage and the current,
wherein the at least one plateau comprises a first plateau and a second plateau having different voltage levels.

41. An apparatus for testing a communication line, comprising: means for applying a voltage as a function of time on the communication line, the function comprising at least one voltage ramp and at least one voltage plateau; means for measuring a current the application of the voltage; and means for calculating at least one electrical property of the communication line based on the voltage and the current,
wherein the at least one ramp comprises a first ramp and a second ramp having different slopes.

* * * * *